United States Patent Office 3,226,292
Patented Dec. 28, 1965

3,226,292
BIS(TRIPROPYLTIN) OXIDE ANTHELMINTIC COMPOSITION AND METHOD OF USING SAME
Robert John Shaver, Midland, Mich., assignor to The Dow Chemical Company, Midland, Mich., a corporation of Delaware
No Drawing. Filed Apr. 18, 1962, Ser. No. 188,527
4 Claims. (Cl. 167—53)

This invention relates to animal husbandry and is particularly concerned with a method and composition for the control of internal parasites in domestic animals.

It is an object of the present invention to provide a new and improved practice in animal husbandry. A further object is to provide a method for the control of parasitic worms in warm-blooded animals. Another object is to provide a new method for the control of nematode and helminth diseases of the gastro-intestinal tract of animals. An additional object is the provision of a novel method for benefitting animals including the control of gastritis and other diseases caused by nematodes. A further object is the provision of novel compositions adapted to be employed in the new method. Other objects will become apparent from the following specification and claims.

The new method for benefitting warm-blooded animals comprises dosing the animals with a bis(tripropyltin) oxide having the formula

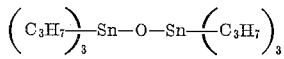

These compounds are clear liquids which are soluble in many common organic solvents and of low solubility in water. They are adapted to be readily and conveniently administered to warm-blooded animals in amounts sufficient to control internal parasites, including ascarids and hookworms, lungworms, stomach and intestinal worms such as cooperids, Haemonchus, Thichostrongylus and Ostertagia, without adversely affecting the animals.

The oral administration or feeding to warm-blooded animals of a chemotherapeutic dose or a parasiticidal dose of the tin oxides, or dose sufficient to control internal parasites, is essential and critical for the practice of the present invention. The amount of one or both of the tin oxides to be administered to the warm-blooded animals must take into account such factors as whether the administration is to be made in a single dose or in multiple doses. When the administration is to be made in a single dose, the generally effective dosage is from about 1 to about 50 milligrams, preferably from 5 to 10 milligrams, per kilogram of host animals body weight. If desired, this dose may be administered in several portions over a period of 24 hours. When the administration is to be made in daily doses over a period of from several days to two weeks, good results are obtained with daily dosages of 0.5 to 5 milligrams per kilogram of body weight.

The method of the present invention can be carried out by the oral administration or force feeding of a chemotherapeutic dose of the unmodified tin oxides. For the control of intestinal parasites, the method is accomplished by the administration of an anthelmintic or vermifuge dose of the compounds. In such procedures, the tin oxides are conveniently administered in gelatin capsules or microcapsules or in the form of tablets. However, the present invention also embraces the employment of a liquid, drench, pellet, powder, mash, mixed grain ration or other animal feed compositions containing as an active agent one or both of the tin oxides. In such usage, the active agent can be modified with one or more of a plurality of cooperating substances such as additaments or innocuous ingestible adjuvants including water, ethanol, 1,2-propanediol, skimmed milk, liquid or solid surface active dispersing agents, ingestible powders and commercial animal feeds, concentrates or supplements. Such augmented compositions are adapted to be fed to animals to supply the desired dosage of active agent or to be employed as concentrates and subsequently diluted with additional carrier to produce the ultimate compositions. In such compositions the carrier cooperates with the active agent to facilitate the invention and obtain an improved result.

The exact concentration of active agent to be employed in a composition can vary provided that a sufficient amount of the composition is ingested by the animals to provide the required dosage of active agent. For example, where individual administration is preferred, liquid, drench or solid compositions containing from 2 to 98 percent by weight of active agent can be employed to supply the desired dosage. Where one or both of the tin oixdes is provided as a constituent of the principal feed ration, the required dosage can be supplied with feed compositions containing from 0.002 to 1 percent by weight of active agent. Where the compound is provided as a constituent of feed supplements for cattle or other animals, good results are obtained with supplements containing from 0.5 to 5 percent by weight of active agent. In compositions to be employed as concentrates, one or both of the tin oxides can be present in a total concentration of active agent of from 5 to 98 percent by weight.

Liquid compositions containing the desired amount of active agent can be prepared by dispersing the compound in water with the aid of a suitable ionic or non-ionic surface active dispersing agent such as glycerol and sorbitan esters. The aqueous compositions may contain one or more water-immiscible oils as a solvent for the active agent. In such compositions, the water, oil and emulsifying agent constitute an aqueous emulsion carrier.

The tin oxides can be formed into wettable powders by grinding with an innocuous solid such as bentonite, fuller's earth or attapulgite and a small amount of a solid wetting agent. These compositions can be administered in the form of capsules or tablets or dispersed in animal feed and such feed used to supply a part or the entire ration.

In the preparation of solid feed compositions, the tin oxides can be mechanically ground with grain or dry feed compositions, or made up into capsules or tablets such as described above and then mixed in the feed. The feed can be given dry or with added water to give it mush-like consistency. Also, the compounds can be dissolved in an edible oil such as coconut or cottonseed oil, and the resulting mixture dispersed in the feed. These edible oil compositions can contain one of the aforementioned emulsifying materials as a dispersing agent.

The following examples illustrate the invention but are not to be construed as limiting.

*Example 1*

Bis(triisopropyltin) oxide is incorporated in a complete mouse feed to prepare a medicated feed composition containing 3 parts of the subject compound per one thousand parts, by weight, of the total feed composition. This medicated feed composition and unmodified feed are fed as sole feed rations to groups of mice which are heavily infested with *Hymenolepis nana* and *Hymenolepis diminuta*.

Seven days following the initiation of the diets, the mice are sacrificed and autopsied. An examination of each mouse is made and the medicated mice compared with the unmedicated mice as regards the number of worms to be found in their gastro-intestinal tracts. As a result of the examination, there is found a substantially complete control of *Hymenolepis nana* and *Hymenolepis diminuta* in the medicated mice with a continued heavy infestation in the unmedicated group.

Example 2

Bis(triisopropyltin) oxide is dispersed in mouse feed to prepare medicated feed compositions containing varying amounts of the tin compound. These compositions and unmodified mouse feed are fed as the sole ration to groups of mice having a heavy infestation of *Ascaris lumbricoides suum* larvae. Seven days following initiation of the diets, the mice are sacrificed and their lungs examined for Ascaris larvae to determine the percent control and kill of the larvae. The concentration of the tin compounds in the diets together with the results of the observations are set forth in the following table:

| Percent by weight of tin compound in diet | Percent control and kill of Ascaris larvae |
|---|---|
| 0.06 | 100 |
| 0.03 | 100 |
| 0.015 | 100 |
| 0.0075 | 93 |

At the time of the observations, the lungs of the unmedicated check group of mice are found to contain a heavy infestation of Ascaris larvae.

Example 3

Bis(triisopropyltin) oxide is administered to groups of sheep being heavily infested with intestinal parasites and voiding known numbers of ova in their feces. The ova include those of Bunostomum sp., Haemonchus sp., Nematodirus sp., Oesophagostomum sp., Ostertagia sp., Trichostrongylus sp. and Cooperia sp. The administration is effected orally by means of gelatin capsules containing the tin compound in quantity sufficient to supply various dosages based upon animal weight. About one week following the administration, the feces of the treated sheep are examined and counts of ova made and compared with pretreatment counts to determine the percent reduction in fecal ova and control of intestinal parasites. The dosages employed together with the results of the observations are set forth in the following table:

| Dosage of tin compound in milligrams per kilogram of body weight | Percent reduction of fecal ova and control of intestinal parasites |
|---|---|
| 5 | 91 |
| 10 | 89 |
| 15 | 99 |
| 20 | 95 |
| 30 | 100 |

Example 4

The subject compound is employed for the control of Strongyloides spp. (threadworms) in groups of sheep known to be heavily infested. Specifically, all the animals are dosed by oral administration in a gelatin capsule of a single dose of 7.5 milligrams of bis(triisopropyltin) oxide per kilogram body weight of each sheep. Another group of sheep is left untreated to serve as a check. Thereafter, all feces passed by the animals are collected and the numbers of threadworms present are determined. Five days after the administration, the animals are necropsied and the number of threadworms present in the intestinal tract determined.

The examinations show that the treated animals pass an average of 425 threadworms during the evaluation period. The necropsy observations establish the intestinal tracts of the treated animals to be free of threadworms. The necropsy observations further establish the intestinal tracts of the untreated animals to contain a heavy infestation of threadworms.

Example 5

Bis(tri-n-propyltin) oxide is employed as described in Example 3 for the control of intestinal organisms in sheep voiding known numbers of ova in their feces including those of Haemonchus sp., Nematodirus sp., Trichostrongylus sp., Strongyloides sp., and Cooperia sp., Ostertagia sp., and Oesophagostomum sp. The administration is as previously described with the feces being collected and counts made of expelled ova. The results together with the employed dosages are set forth in the following table.

| Milligrams per kilogram of body weight | Percent average reduction in eggs per gram |
|---|---|
| 10 | 94 |
| 15 | 85 |
| 20 | 96 |

Example 6

Ninety parts by weight of bis(triisopropyltin) oxide is mechanically ground with 10 parts of bentonite to produce a medicated composition containing the bis(triisopropyltin) oxide as an active agent.

In a similar manner, a medicated composition is prepared by grinding 50 parts by weight of bis(tri-n-propyltin) oxide with 1 part of sorbitan monopalmitate (Span 20) and 49 parts of aluminum magnesium silicate (attapulgite).

In a further operation, 20 parts by weight of bis(tri-n-propyltin) oxide is mixed with 80 parts of soybean meal to prepare a medicated composition containing the bis-(tri-n-propyltin) oxide as an active agent.

In an additional operation, 10 parts by weight of bis-(triisopropyltin) oxide are dispersed in cottonseed oil to prepare a composition containing the subject compound in the form of edible liquid.

These compositions are adapted to be administered to animals to supply the desired dosage of active agent or to be employed as concentrates and subsequently diluted with additional edible carrier and particularly with commercial animal feeds or supplements to produce feed compositions containing the desired amount of active agent.

Example 7

Bis(triisopropyltin) oxide is administered to a sheep voiding a large number of ova including those of Haemonchus sp., Nematodirus sp., Trichostrongylus sp. and Strongyloides sp. The administration is effected orally by means of a gelatin capsule and in a quantity sufficient to supply a dosage of 7.5 milligrams per kilogram of body weight. Following the administration, the passed feces are collected and counts made of expelled parasites. After six days, the sheep is sacrificed and the intestines examined for the named parasite species to determine the percent control and expulsion of parasites. The number and type of intestinal parasite expelled following the administration together with the percent control and kill of the particular parasite are set forth in the following table:

| Parasite species | Total number of parasites expelled | Percent control of parasite species |
|---|---|---|
| Haemonchus | 300 | 83 |
| Nematodirus | 2,250 | 100 |
| Trichostrongylus | 8,700 | 94 |
| Strongyloides | 150 | 100 |

The tin oxides are prepared in good yield in known procedures by reacting the suitable trialkyltin bromide with a small molecular excess of sodium hydroxide, in a reaction medium such as ether. The reaction goes forward under ordinary reaction conditions. Following the reaction, the solvent is removed by evaporation to obtain the product as a residue which is further purified by conventional procedures.

What is claimed is:

1. In the practice of animal husbandry, the method which comprises administering orally to a warm-blooded animal infested with worms a chemotherapeutic dose of bis(tripropyltin) oxide.

2. The method useful for the control of worms which comprises feeding bis(tripropyltin) oxide to a warm-blooded animal in the amount of from 1 to 50 milligrams per kilogram of body weight.

3. The method claimed in claim 1 wherein the bis(tripropyltin) oxide is admixed with an innocuous ingestible adjuvant.

4. The composition comprising an animal feed containing from 0.02 to 1 percent by weight of bis(tripropyltin) oxide.

References Cited by the Examiner

UNITED STATES PATENTS

| 2,523,252 | 9/1950 | Smith | 167—48 |
| 2,702,775 | 2/1955 | Kerr | 167—53 |
| 3,082,230 | 3/1963 | Dorfelt | 260—429.7 |

OTHER REFERENCES

Agricultural and Food Chemistry, vol. 2, No. 8, April 14, 1954.

Chem. Abst., vol. 51, 1957, page 12842d.

Pest Control, vol. 20, No. 7, July 1952, pages 46 and 48.

Williams: Chem. Abst., vol. 55, 1961, page 5389c.

JULIAN S. LEVITT, *Primary Examiner.*

FRANK CACCIAPAGLIA, Jr., LEWIS GOTTS,
*Examiners.*